No. 855,199. PATENTED MAY 28, 1907.
J. PARTINGTON.
RESILIENT WHEEL FOR VEHICLES.
APPLICATION FILED JUNE 11, 1906.

Attest:
C. S. Middleton
Edward N. Sarton

Inventor
John Partington,
by Spear, Middleton, Donaldson & Spear
Attys.

UNITED STATES PATENT OFFICE.

JOHN PARTINGTON, OF SALTAIRE, ENGLAND.

RESILIENT WHEEL FOR VEHICLES.

No. 855,199.  Specification of Letters Patent.  Patented May 28, 1907.

Application filed June 11, 1906. Serial No. 321,207.

*To all whom it may concern:*

Be it known that I, JOHN PARTINGTON, a subject of the King of Great Britain and Ireland, residing at Dallam House, Nab Wood, Saltaire, in the county of York, England, have invented certain Improvements in and Relating to Resilient Wheels for Vehicles; for which I have made application for a patent in Great Britain, No. 4,754, dated the 27th day of February, 1906.

This invention relates to certain improvements connected with resilient wheels, the objects of which are to enable the wheel to quickly adapt itself to uneven ground, and to positively get a transverse grip on the road so as to prevent the skidding of vehicles.

According to my invention I construct wheels with a broad tread which is divided up into a number of sections, each of which is resilient and capable of independently adjusting itself to the road.

With my improved wheel the sectional tread more effectually conforms to and keeps in contact with the irregular surface of road, and the violence of ground shocks is reduced and the life of the vehicle and propelling mechanism of motor car and the like is prolonged in proportion to the decreased violence of said shocks; and by the improved construction, the liability to skidding is greatly reduced when traveling at a rapid rate.

Figure 1:
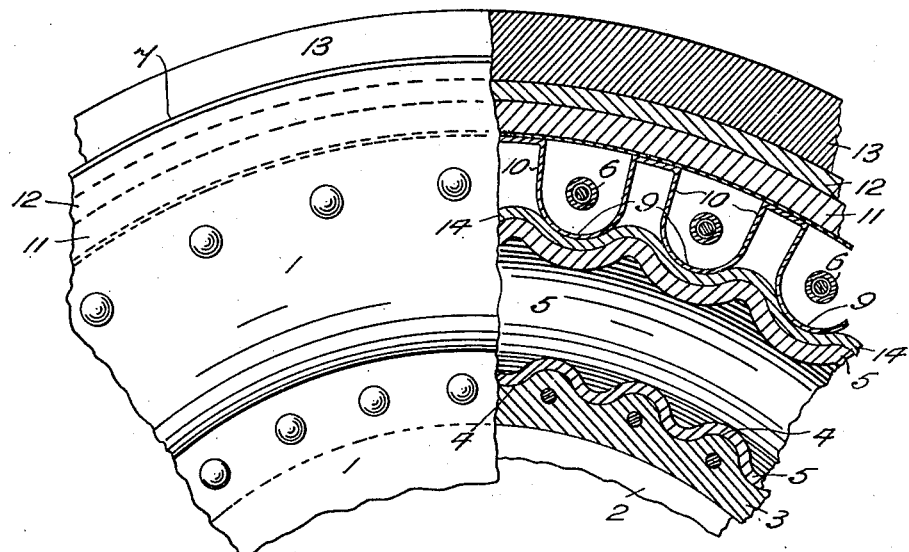
Figures 2, 3:
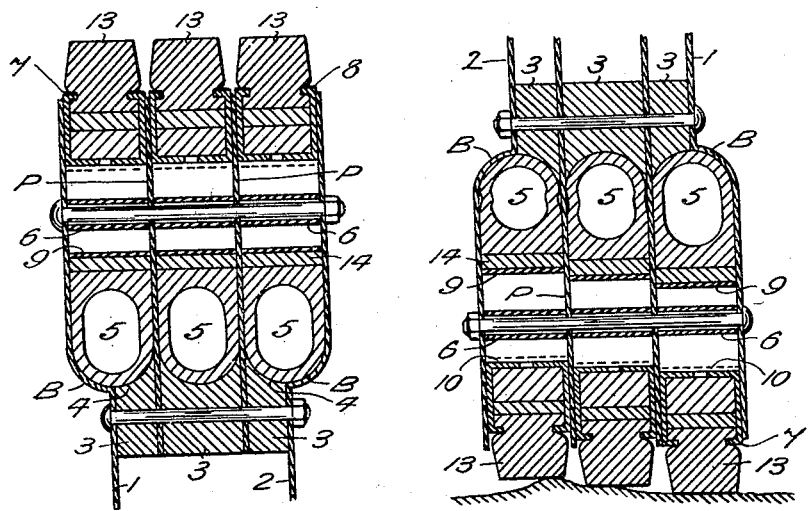

In describing my invention in detail, reference is made to the accompanying sheet of drawings, in which Figure 1 represents a side elevation of a portion of a wheel rim partly in section. Fig. 2 is a cross section through said rim, provided with independent treads, and Fig. 3, is a similar view showing the wheel traveling over an uneven road.

In the illustrations given, the side plates 1 and 2 may be connected to the wheel hub, and rotary motion transmitted thereto in any convenient manner, and between said side plates, division plates P are inserted which may extend to wheel hub and be secured thereto. They are also held in position at the rim by disks 3 and tubular distance pieces 6, placed between same, the rim being held together by bolts or the like as clearly shown.

The outward circumference of each disk 3, is corrugated at 4, and these corrugations may be extended on the curved portion B of side plates, the corrugations on curved portion of said plates being formed by stamping or pressing in a well known manner. Around each of these corrugated surfaces formed at the bottom of parallel grooves, is an inflated pneumatic tube 5 or like elastic cushion, and over the external circumference of said tube, is a flexible belt 14, applied for the purpose of protecting said tube.

Extending beyond the circumference of guide plates, are flanged rings 7 and 8, forming part of the respective floating rims. Each rim is provided with a corrugated surface 9 which may be formed of thin metal plate 10 preferably of steel or other material adapted to spring, this plate is secured to a rim 11 of wood or the like placed within a ring of iron 12 and secured thereto.

The external circumference or tread of each section of wheel may be a covering of wood or other blocks, or the entire circumference may be a ring of elastic or non-elastic material 13, secured in contact with ring 12 in a suitable manner, such as by engaging with rings 7 and 8 as indicated.

The wheel treads are adapted to float within the parallel grooves upon the respective pneumatic tubes 5 or like cushions compressed between the corrugated surfaces 4 of disks 3, and 9 of the floating rims, the corrugations in relation to each other, when in their normal position being preferably as shown by the drawings.

It will be obvious that when the vehicle is traveling over a flat or smooth road, the respective pneumatic tubes will be equally depressed, but when traveling over a road having an uneven surface, the section or sections of wheel tread on rolling over a projection on the road, will be readily pressed toward the axle, and thereby deflect the inflated tube or tubes or like cushion of the floating rim or rims in contact with the ground projection, more than the other section or sections, by which rebounding ground shock vibrations imparted to the vehicle are reduced, thus giving longer life to the vehicle and propelling machinery carried thereby; also by arranging the wheel tread in sections, and providing each section with an elastic cushion such as described, resilience is obtained and a better grip on the ground maintained, and thereby skidding minimized.

What I claim as my invention is

A wheel having a broad tread divided into sections, each section comprising a hub portion having a corrugated outer circumference, a rim portion having a corrugated inner circumference, said corrugations in the rim portion being separated from each other by cavities and a cushion between the two corrugated surfaces.

In testimony whereof, I have subscribed my name in the presence of two witnesses.

JOHN PARTINGTON.

Witnesses:
JOHN GILL,
H. PARTINGTON.